United States Patent [19]
Meisch

[11] 3,903,265
[45] Sept. 2, 1975

[54] METHOD OF REMOVING DEAD TISSUE FROM THE UTERUS OF DAIRY COWS BY MEANS OF HYDROGEN PEROXIDE

[76] Inventor: Gene F. Meisch, 1750 Summit Ave., Altura, Minn. 55105

[22] Filed: July 26, 1973

[21] Appl. No.: 382,731

[52] U.S. Cl. .............................................. 424/130
[51] Int. Cl.² ...................................... A61K 33/40
[58] Field of Search ................................... 424/130

[56] References Cited
OTHER PUBLICATIONS

Miller et al. – Encyclopedia of Animal Care (1962) pages 953–956.

Winslow et al. – Veterinary Mareria Medica and Therapeutics (1919) page 101.

*Primary Examiner*—Stanley J. Friedman
*Attorney, Agent, or Firm*—Stuart R. Peterson

[57] ABSTRACT

A dilute solution of hydrogen peroxide is infused into a cow's uterus for the purpose of removing dead afterbirth tissue, thereby reducing the likelihood of a subsequent reproductive failure.

4 Claims, No Drawings

METHOD OF REMOVING DEAD TISSUE FROM THE UTERUS OF DAIRY COWS BY MEANS OF HYDROGEN PEROXIDE

BACKGROUND OF THE INVENTION

1. Field of the Invention

This invention relates generally to the breeding of cattle, and pertains more particularly to a method of reducing the number of reproductive failures currently being experienced.

2. Description of the Prior Art

Infertility in their herds has plagued dairymen from time immemorial. While the problem is generally known, a satisfactory solution that will be financially rewarding is not as yet known. Surveys have conservatively demonstrated that about 5% of dairy cows in this country become infertile each year. Realistic estimates have ranged up to even 10% of the cow population going out of production each year. Based on Michigan Dairy Herd Improvement Association (DHIA) records, over 850,000 cows in the United States are lost each year due to infertility. When it is recognized the period of as long as two and one half years elapses from the time a calf is born to the time she has her first offspring, and that furthermore cows on the average go to market when they are six years old because of their inability to reproduce, even though a diseasefree cow can milk up to twelve years of age, the cost attributable to infertility is indeed staggering. It is not believed necessary to present specific dollar amounts, although the losses go into the millions per year for U.S. dairymen alone. Such figures are readily available. All that is necessary is to appreciate that the amount that is lost each year warrants the expenditure of a considerable amount of effort to reduce the losses that have confronted livestock producers in the past.

A substantial proportion of the infertility that currently exists in cows can be attributed to diseases within the cow's uterus. Unfortunately, the uterus acts as an incubator, providing an excellent breeding ground for bacteria. Unexpelled placenta or afterbirth literally decays within the uterus, becoming dead tissue that greatly promotes bacterial action with a concomitant damaging infection that militates against conception; the sperm simply cannot survive in such an adverse environment, and even if it does, the fertilized egg and the resulting fetus cannot remain alive and the cow aborts during the gestation period. While manual removal by reaching into the uterus to dislodge the unexpelled placenta has been resorted to, this is a somewhat complicated procedure, requiring a relatively high degree of skill and experience, and proves to be quite costly, particularly if done on a large scale. Also, some damage to the uterine lining can occur from the pulling or tearing, thereby necessitating the use of relatively expensive antibiotics to help prevent infection.

SUMMARY OF THE INVENTION

Accordingly, an important object of my invention is to provide a simple and effective method for removing dead tissue from the uterus of a cow.

Another object is to provide a method that is relatively fast, one that does not require a high degree of skill from the person performing the method, and which does not require costly materials.

Yet another object of the invention is to provide a method that not only dislodges placenta still retained within the uterus but which at the same time inhibits further bacterial growth within the uterus. More specifically, an aim of my invention is to provide a foaming agent that dislodges or breaks loose the cotyledons, concomitantly serving as an antisepsis and a general flushing compound for the placenta after it has been detached, also functioning to remove other "debris", such as pus cells, red blood cells, white blood cells and blood clots that might have formed within the uterus, these being usually present after calving.

Still another object is to provide a method that can be systematically employed during the first heat period after delivery, thereby permitting cows to be bred generally sooner and usually more successfully than where my method is not practiced. In this regard, successful conception can be achieved during the second heat period, although it is generally recommended that cows not be bred until the first heat period following 50–60 days after calving which would normally be the third or fourth period.

On the other hand, the breeder can wait until a cow has been observed for several heat periods, and if no conception has taken place, then my method can be resorted to. Stated somewhat differently, the use of my method can be postponed to a heat period subsequent to such a period during which insemination has failed to cause the cow to settle. Hence, an aim of the invention is to provide considerable flexibility and leeway as to when it will be invoked.

Briefly stated, the foregoing objects can be easily achieved when practicing my invention, the invention basically involving the administering or infusing of a dilute solution of hydrogen peroxide into the interior of the uterus so as to effect removal of remaining pieces of placenta or afterbirth.

DESCRIPTION OF THE PREFERRED EMBODIMENT

As herein before explained, pieces of placenta will remain in the uterus of a cow after calving. This afterbirth poses a severe problem in that bacteria will be encouraged to breed and thrive in such void, the consequence being that infection usually results and a temporary infertility sets in, the temporary infertility sometimes rendering the cow permanently sterile.

While a cow's overall reproductive system is fairly complex, although certainly simpler than that of a human female, it is not felt necessary to present a detailed description of what is generally known amongst cattle breeders and certainly which can be studied in greater depth if the reader finds it necessary to augment the rather abbreviated description herein given.

To appreciate the benefits to be derived from a practicing of my invention, only a few basic parts of the reproductive system need be referred to. Inasmuch as the invention concerns the removal of dead tissue from the uterus, it need only be explained that this organ functions as the calf bed where the fertilization takes place and where the fetus develops and grows. What will be termed the "genital tract" is the vagina and the cervix, the vagina constituting the passageway from the vulva or external opening of the female reproductive tract to the cervix which extends from the vagina to the uterus.

Perhaps the above is an over simplification as far as the description of the several organs that are involved as far as my method is concerned, but certainly there are a variety of text books that can be consulted if circumstances so require. There is a booklet titled "Dairy Cattle Sterility", published in 1969 by Hoard's Dairyman, The National Dairy Farm Magazine, Fort Atkinson, Wis. 53538, that is an excellent treatise in that it deals adequately with the economics of sterility and infertility, and also provides a readily understandable description of the organs constituting the reproductive system of a cow (and also that of a bull).

During a cow's so-called heat period, the uterus, which normally hangs down into the abdominal cavity, rises so that it is generally at the same height or elevation as the pelvic girdle, the uterus being just forward of the pelvic girdle. Also, the cross section of the cervix enlarges during this period. Use is made of these two phenomena in practicing my method, for during this period a dilute solution of hydrogen peroxide ($H_2O_2$) can be quite readily infused into the uterus via the genital tract. More specifically, a tube is inserted through the vulva into the genital tract composed of the vagina and cervix, the tube having a sufficient length such that the inner end thereof projects slightly into the uterus.

The other end, this being the outer end of the inserted tube, is connected to a suitable container having a sufficient volumetric capacity so as to provide enough solution to the raised uterus. It is desired that the void within the uterus be approximately half filled with the hydrogen peroxide solution, actually amounting to approximately eight fluid ounces. It will be recalled that during a heat period the uterus assumes a generally horizontal raised position, thereby making it such that the uterus requires less solution and yet, for the most part, causing the fluid to contact the remaining pieces of placenta. Of course, it is essential that the method be performed during the heat period in order to obtain access to the uterus which is difficult to obtain during any other period.

The solution that I have found so efficacious consists of hydrogen peroxide having a strength of from 2 to 3 percent on a weight basis. The supply container for the hydrogen peroxide solution is raised only enough to cause the appropriate quantity of solution to gravitationally flow into the uterus via the genital tract.

The uterus, which contains the unwanted miscellaneous debris, acts as an incubator as far as encouraging the rapid growth and increase in bacteria. The multiplication of bacteria is especially enhanced by the sections of placenta still clinging to the uterine lining. These fragments, sometimes small and sometimes quite large, are retained in place, resisting dislodgement, by virtue of the various cotyledons that have not released themselves, the cotyledons having originally served as the means for supplying nutrients from the mother cow to the fetus within the uterus. Before birth, these button-like attachments or cotyledons range from 80 to 120 in number. Obviously, it is only those that have not released themselves during delivery that prove troublesome. It is the function of the hydrogen peroxide solution to effect the release and hence the detachment of the afterbirth fragments that provide such a fertile feeding ground for the bacteria and the production of disease resulting from the increased bacteria production. One of the characteristics of hydrogen peroxide is its foaming capability. This capability is greatly enhanced by reason of the infected environment within the uterus. Owing to the fact that the liquid solution works itself into the spongy cotyledons, foaming within their interstices, a gentle pressure develops within the cotyledons that acts, by reason of the expansion occurring due to the foaming, to break loose the cotyledons from the uterine lining. Although a localized situation prevails as far as the dislodgement of the cotyledons is concerned, it is to be taken into account that the hydrogen peroxide solution pervades a sizable portion of the uterus' interior and provides an antiseptic action generally throughout that inhibits further micro-organism growth within the confines of the uterus. Stated somewhat differently, the hydrogen peroxide solution is performing a dual function during the time that it is acting upon the cotyledons.

The major portion of the hydrogen peroxide solution is allowed to remain within the uterus for approximately ten minutes followed by a palpation period of three to four minutes when needed, and then the remainder drained back out through the genital tract, the draining literally flushing out the placenta and any other debris such as blood clots within the uterus. It will be recognized that due to the straining of the cow that some of the solution is ejected prior to the elapse of the ten minutes mentioned above; nonetheless, the major portion remains for the alluded to period. However, palpation, more precisely a gentle massaging, has been used to increase the efficacy of tissue removal, for if some of the cotyledons have a tendency to remain adhered to the uterine wall, the gentle massaging assists in breaking whatever few remaining cotyledons there are loose. It will be recognized that the reproductive tract of the cow is subjacent the rectum and that the massaging can be manually performed by reaching into this passage and flexing the uterus wall through the colon wall. Whether the supplemental palpating or gentle massaging step is utilized depends principally on the interval between the time of delivery and the time my method is inaugurated, the longer the interval, the greater the inherent resistance to loosening as a result of just the action from the peroxide itself. Quite obviously, palpation also results in a more complete removal of the solution, but it is in no way harmful to leave some of the solution in the animal, particularly because of the decomposition that occurs; in other words, the $H_2O_2$ reduces to $H_2O$.

While infertility can result from other causes, the dominant one definitely is attributable to the germ-infested environment within the uterus itself, promoted largely by the unexpelled pieces of placenta or afterbirth. Not only does my invention produce the effective removal of this troublesome dead tissue, but it also promotes generally a sterilized condition within the uterus, thereby creating a sanitary environment more conducive to conception and also conducive to the growth of the fetus thereafter.

I claim:

1. A method of removing placenta from the uterus of a cow during a heat period comprising the step of introducing a peroxide solution of sufficient strength and amount into the uterus via the cow's genital tract to produce a level of the solution within the uterus that a major number of the cotyledons remaining are submerged, and allowing said solution to remain in the uterus until enough of the cotyledons are loosened or detached to permit expulsion of at least some of the placenta, and then removing a major portion of the solution.

2. The method of claim 1 in which said solution is from two to three percent hydrogen peroxide by weight and said amount is approximately 8 fluid ounces.

3. The method of claim 2 including the additional step of assisting the expelling of placenta by gently massaging the uterus via the cow's rectal tract.

4. The method of claim 1 in which said solution is introduced subsequent to a heat period in which insemination has failed to cause the cow to settle.

* * * * *